(12) United States Patent
Gilson et al.

(10) Patent No.: US 12,060,834 B2
(45) Date of Patent: Aug. 13, 2024

(54) HYBRID ELECTRIC IDLE AND BRAKING FOR AN AIRCRAFT

(71) Applicant: RTX Corporation, Farmington, CT (US)

(72) Inventors: Jonathan Gilson, West Hartford, CT (US); Zubair Ahmed Baig, South Windsor, CT (US); Martin Richard Amari, Glastonbury, CT (US); Michael Winter, New Haven, CT (US)

(73) Assignee: RTX CORPORATION, Farmington, CT (US)

( * ) Notice: Subject to any disclaimer, the term of this patent is extended or adjusted under 35 U.S.C. 154(b) by 96 days.

(21) Appl. No.: 17/314,202

(22) Filed: May 7, 2021

(65) Prior Publication Data

US 2022/0356849 A1 Nov. 10, 2022

(51) Int. Cl.
| | | |
|---|---|---|
| *F02C 7/32* | (2006.01) | |
| *B64D 27/16* | (2006.01) | |
| *B64D 27/24* | (2006.01) | |
| *F01D 15/10* | (2006.01) | |
| *F01D 19/02* | (2006.01) | |
| *B64D 27/02* | (2006.01) | |

(52) U.S. Cl.
CPC ............... *F02C 7/32* (2013.01); *B64D 27/16* (2013.01); *B64D 27/24* (2013.01); *F01D 15/10* (2013.01); *F01D 19/02* (2013.01); *B64D 27/026* (2024.01); *F05D 2220/323* (2013.01); *F05D 2220/76* (2013.01)

(58) Field of Classification Search
CPC ..... B64D 2027/026; B64D 27/24; F02C 7/32; F01D 15/10; F01D 19/02; F05D 2220/323; F05D 2220/76
See application file for complete search history.

(56) References Cited

U.S. PATENT DOCUMENTS

| 7,973,422 B2 | 7/2011 | Colin et al. |
| 10,436,122 B2 | 10/2019 | Cline et al. |
| 10,717,539 B2 | 7/2020 | Menheeere |
| (Continued) | | |

FOREIGN PATENT DOCUMENTS

| EP | 3611360 A1 | 2/2020 |
| EP | 3751118 A1 | 12/2020 |

OTHER PUBLICATIONS

European Search Report for European Application No. 22172394.3; Date of Action: Sep. 27, 2022; 6 pages.

*Primary Examiner* — Scott J Walthour
(74) *Attorney, Agent, or Firm* — CANTOR COLBURN LLP

(57) ABSTRACT

An engine system of an aircraft includes an energy storage system, a gas turbine engine, and a controller. The gas turbine engine includes a low spool, a high spool, a low-spool generator operably coupled to the low spool, and a high-spool electric motor operably coupled to the high spool. The controller is configured to detect a braking condition of the aircraft, transfer power from the low-spool generator to the energy storage system based on the storage capacity state of the energy storage system, and transfer power to the high spool through the high-spool electric motor to support combustion in the gas turbine engine while a rotational speed of the low spool is reduced responsive to the low-spool generator extracting energy from the low spool.

16 Claims, 6 Drawing Sheets

(56) References Cited

U.S. PATENT DOCUMENTS

| | | | |
|---|---|---|---|
| 2011/0178648 A1* | 7/2011 | Calvignac | F02C 7/32 |
| | | | 700/291 |
| 2017/0074211 A1* | 3/2017 | Smith | F02K 1/72 |
| 2017/0187311 A1* | 6/2017 | French | H02K 7/1823 |
| 2017/0226934 A1 | 8/2017 | Robic et al. | |
| 2017/0335713 A1* | 11/2017 | Klemen | F01D 15/10 |
| 2018/0354631 A1* | 12/2018 | Adibhatla | F02C 3/113 |
| 2020/0031480 A1* | 1/2020 | Baig | B60L 58/20 |
| 2020/0378310 A1* | 12/2020 | Tu | F02C 7/32 |
| 2020/0392859 A1* | 12/2020 | Turner | F02K 5/00 |

* cited by examiner

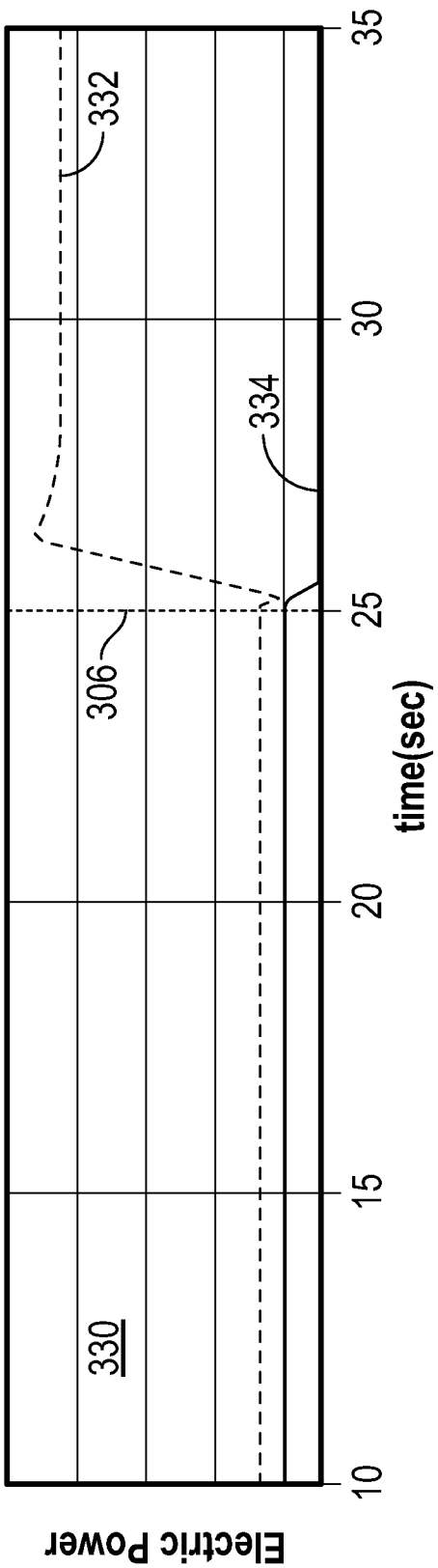

HYBRID ELECTRIC IDLE AND BRAKING FOR AN AIRCRAFT

BACKGROUND

Exemplary embodiments of the present disclosure pertain to the art of rotating machinery and, more particularly, to a method and a system for hybrid electric idle and braking for an aircraft.

Gas turbine engines are typically inefficient to operate at low power settings. Operation of a gas turbine engine at idle is the typical lowest power setting available once the gas turbine engine has been started. In some instances, thrust produced at idle may be greater than the thrust needed for ground-based operations, such as taxiing and waiting in a parked position prior to takeoff or after landing. This can result in excess fuel consumption and may reduce component life with many repeated taxi, takeoff, and landing cycles. The excess thrust is typically managed by using brakes. Brake wear and deterioration can occur during taxi prior to takeoff and after landing.

BRIEF DESCRIPTION

Disclosed is an engine system of an aircraft that includes an energy storage system, a gas turbine engine, and a controller. The gas turbine engine includes a low spool, a high spool, a low-spool generator operably coupled to the low spool, and a high-spool electric motor operably coupled to the high spool. The controller is configured to detect a braking condition of the aircraft, transfer power from the low-spool generator to the energy storage system based on the storage capacity state of the energy storage system, and transfer power to the high spool through the high-spool electric motor to support combustion in the gas turbine engine while a rotational speed of the low spool is reduced responsive to the low-spool generator extracting energy from the low spool.

In addition to one or more of the features described above, or as an alternative to any of the foregoing embodiments, the controller can be further configured to detect the braking condition based on a thrust command and an operating mode of the aircraft.

In addition to one or more of the features described above, or as an alternative to any of the foregoing embodiments, power transfer can be performed based on determining that the operating mode of the aircraft is a taxi mode or a landing mode.

In addition to one or more of the features described above, or as an alternative to any of the foregoing embodiments, the low-spool generator can be a low-spool electric machine configurable between a low-spool generator mode and a low-spool motor mode of operation, and the high-spool electric motor can be a high-spool electric machine configurable between a high-spool generator mode and a high-spool motor mode of operation.

In addition to one or more of the features described above, or as an alternative to any of the foregoing embodiments, the storage capacity state can indicate a capacity to receive a power surge from the low-spool generator.

In addition to one or more of the features described above, or as an alternative to any of the foregoing embodiments, the controller can be configured to split energy output of the low-spool generator between the energy storage system and the high-spool electric motor based on the storage capacity state and a target speed of the high spool.

In addition to one or more of the features described above, or as an alternative to any of the foregoing embodiments, the controller can be configured to determine a demand associated with one or more accessories driven by the high spool and one or more target engine pressures, and control the high-spool electric motor to adjust a rotational speed of the high spool during the braking condition based on the demand associated with the one or more accessories driven by the high spool and the one or more target engine pressures.

In addition to one or more of the features described above, or as an alternative to any of the foregoing embodiments, the controller can be configured to monitor for a flutter condition during landing of the aircraft and adjust operation of the low-spool generator and/or the high-spool electric motor to reduce the flutter condition.

In addition to one or more of the features described above, or as an alternative to any of the foregoing embodiments, the braking condition can include operating the gas turbine engine at a minimum fuel limit, and the low-spool generator can reduce a speed and thrust output of the low spool below nominal minimum values associated with the minimum fuel limit by adding a load to the low spool.

In addition to one or more of the features described above, or as an alternative to any of the foregoing embodiments, the gas turbine engine can include a thrust reverser, and power transfer to the high spool through the high-spool electric motor can be performed when the thrust reverser is deployed.

Also disclosed is a method that includes detecting a braking condition of an aircraft having a gas turbine engine including a low spool and a high spool and determining a storage capacity state of an energy storage system of the aircraft. Power can be transferred from a low-spool generator to the energy storage system based on the storage capacity state of the energy storage system. Power can be transferred to the high spool through a high-spool electric motor to support combustion in the gas turbine engine while a rotational speed of the low spool is reduced responsive to the low-spool generator extracting energy from the low spool.

In addition to one or more of the features described above, or as an alternative to any of the foregoing embodiments, the method can include detecting the braking condition based on a thrust command and an operating mode of the aircraft.

In addition to one or more of the features described above, or as an alternative to any of the foregoing embodiments, the method can include splitting energy output of the low-spool generator between the energy storage system and the high-spool electric motor based on the storage capacity state and a target speed of the high spool.

In addition to one or more of the features described above, or as an alternative to any of the foregoing embodiments, the method can include determining a demand associated with one or more accessories driven by the high spool and one or more target engine pressures, and controlling the high-spool electric motor to adjust a rotational speed of the high spool during the braking condition based on the demand associated with the one or more accessories driven by the high spool and the one or more target engine pressures.

In addition to one or more of the features described above, or as an alternative to any of the foregoing embodiments, the method can include monitoring for a flutter condition during landing of the aircraft, and adjusting operation of the low-spool generator and/or the high-spool electric motor to reduce the flutter condition.

BRIEF DESCRIPTION OF THE DRAWINGS

The following descriptions should not be considered limiting in any way. With reference to the accompanying drawings, like elements are numbered alike:

FIG. 6 is a plot of torque change on a low spool and a high spool before and after a braking condition, in accordance with an embodiment of the disclosure;

FIG. 7 is a plot of electrical power output change at a low-spool electric machine and a high-spool electric machine before and after a braking condition, in accordance with an embodiment of the disclosure.

DETAILED DESCRIPTION

A detailed description of one or more embodiments of the disclosed apparatus and method are presented herein by way of exemplification and not limitation with reference to the Figures.

Figure 1:
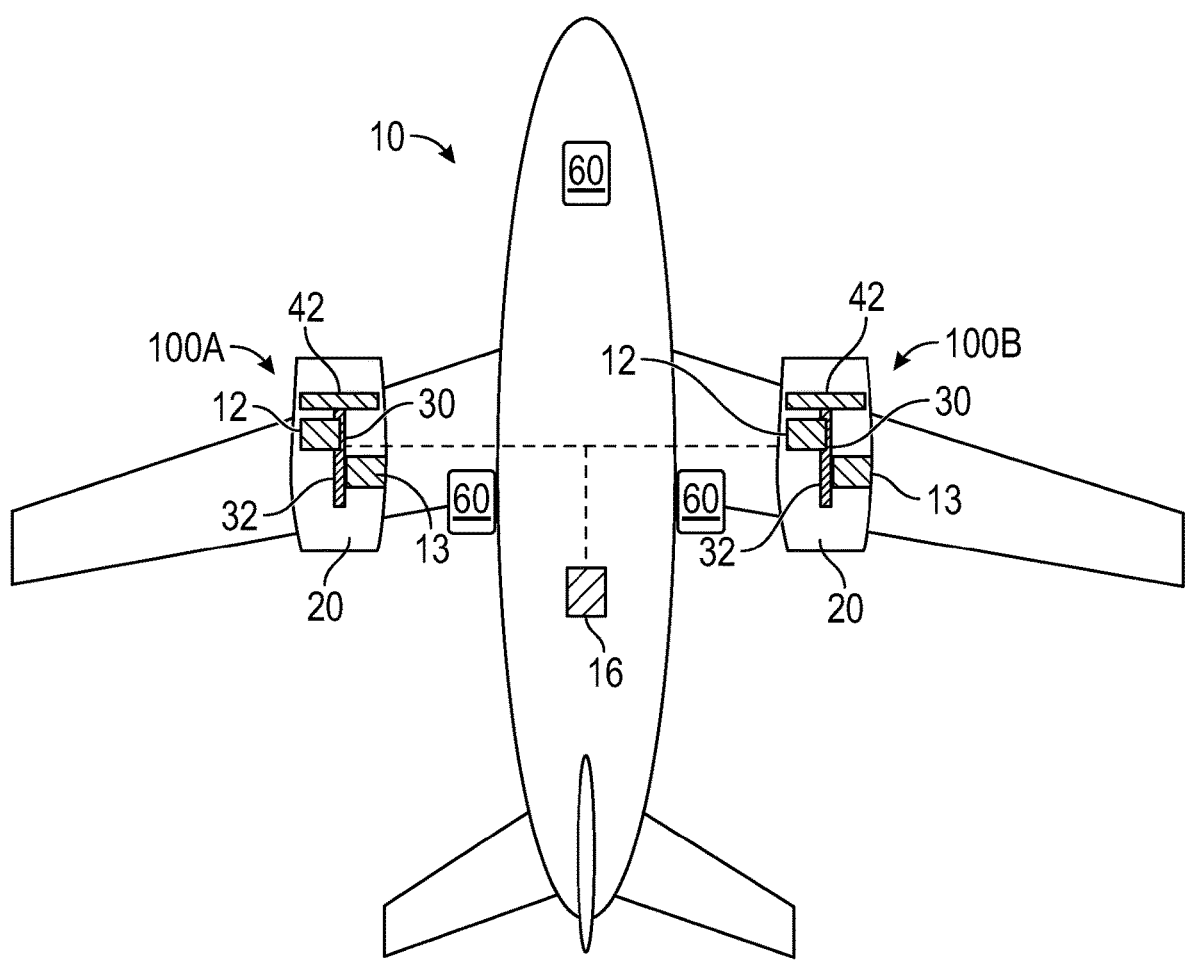
FIG. 1 is a schematic diagram of an aircraft, in accordance with an embodiment of the disclosure.

FIG. 1 schematically illustrates an aircraft 10 that includes a pair of hybrid electric propulsion systems 100A, 100B (also referred to as hybrid gas turbine engines 100A, 100B or hybrid propulsion systems 100A, 100B). Each of the hybrid electric propulsion systems 100A, 100B includes a gas turbine engine 20 with a low spool 30 configured to drive rotation of a fan 42. Gas turbine engine 20 also includes a high spool 32 that operates at higher speeds and pressures than the low spool 30. A low-spool electric machine 12 can extract or add rotational power, for instance, by modifying torque and speed of the low spool 30 and fan 42. A high-spool electric machine 13 can be configured to extract or add rotational power to the high spool 32.

At least one power source 16 of the aircraft 10 can provide electrical power to or receive electrical power from the low-spool electric machine 12 and/or the high-spool electric machine 13 of the gas turbine engines 20 and/or other components of the aircraft 10. The power source 16 can be an energy storage system that stores electrical and/or mechanical energy. For example, the power source 16 can include one or more of a battery, a super capacitor, an ultra-capacitor, a flywheel, and the like. Where the aircraft 10 includes an additional thermal engine (not depicted), such as an auxiliary power unit, the power source 16 can also be coupled to one or more components of the additional thermal engine. The power source 16 can be coupled to other energy producing or consuming systems of the aircraft 10, such as an electrical power distribution system, an environmental control system, an anti-ice/deicing system, and/or other such aircraft systems (not depicted).

The aircraft 10 also includes a wheel and brake system 60 that allows for ground-based movement, steering, and braking of the aircraft 10. Embodiments of the present disclosure control operation of the hybrid electric propulsion systems 100A, 100B to reduce brake wear of the wheel and brake system 60 as further described herein.

While the example of FIG. 1 illustrates a simplified example of the gas turbine engine 20, it will be understood that any number of spools can be incorporated, and inclusion or omission of other elements and subsystems are contemplated. Further, systems described herein can be used in a variety of applications and need not be limited to gas turbine engines for aircraft applications.

Figure 2:
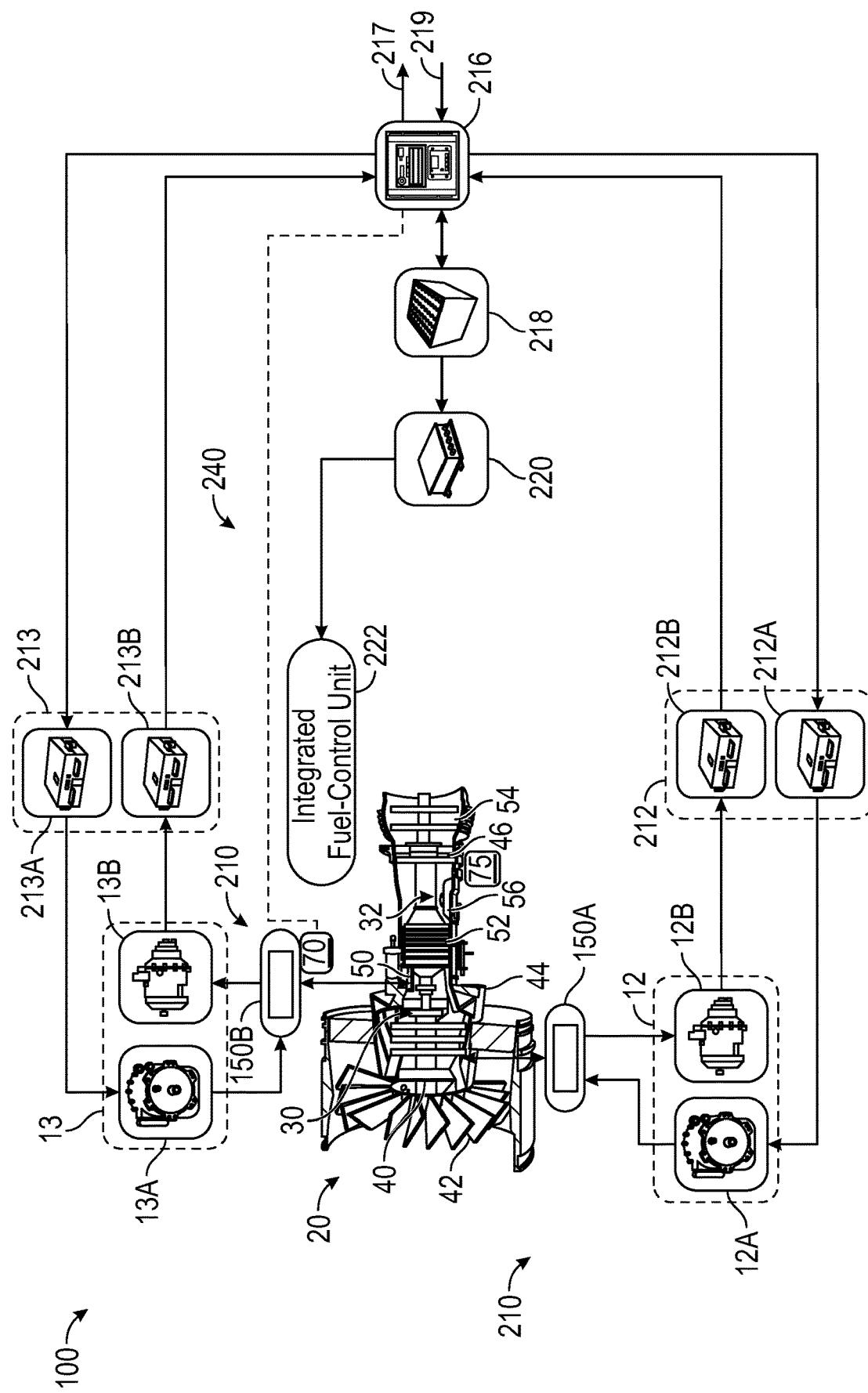
FIG. 2 is a schematic diagram of a hybrid electric propulsion system, in accordance with an embodiment of the disclosure.

FIG. 2 illustrates a hybrid electric propulsion system 100 (also referred to as hybrid gas turbine engine 100, hybrid propulsion system 100, or engine system 100) as a further example of the hybrid electric propulsion system 100A, 100B of FIG. 1. In the example of FIG. 2, the hybrid electric propulsion system 100 includes gas turbine engine 20 operably coupled to an electrical power system 210 as part of a hybrid electric aircraft, such as aircraft 10 of FIG. 1. One or more mechanical power transmissions 150 (e.g., 150A, 150B) can be operably coupled between the gas turbine engine 20 and the electrical power system 210. The gas turbine engine 20 includes one or more spools, such as low spool 30 and high spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50).

The electrical power system 210 can include a low-spool electric machine 12 and a high-spool electric machine 13. The low-spool electric machine 12 can be configurable between a low-spool motor mode of operation and a low-spool generator mode of operation. Alternatively, the low-spool electric machine 12 can be implemented as a low-spool electric motor 12A and a low-spool generator 12B coupled to the mechanical power transmission 150A. Similarly, the high-spool electric machine 13 can be configurable between a high-spool motor mode of operation and a high-spool generator mode of operation. Alternatively, the high-spool electric machine 13 can be implemented as a high-spool electric motor 13A and a high-spool generator 13B coupled to the mechanical power transmission 150B. The low-spool electric machine 12 and high-spool electric machine 13 can have a large capacity, such as a megawatt or more.

In the example of FIG. 2, the mechanical power transmission 150A can include a gearbox operably coupled between the inner shaft 40 and the low-spool electric machine 12. The mechanical power transmission 150B can include a gearbox operably coupled between the outer shaft 50 and the high-spool electric machine 13. The mechanical power transmission 150A, 150B and/or electric machines 12, 13 can include a clutch or other interfacing element(s) to selectively engage or disengage the electric machines 12, 13.

The electrical power system 210 can also include low-spool power conditioning electronics 212 and high-spool power conditioning electronics 213. The low-spool power conditioning electronics 212 can include motor drive electronics 212A and rectifier electronics 212B. Similarly, the high-spool power conditioning electronics 213 can include motor drive electronics 213A and rectifier electronics 213B. The motor drive electronics 212A, 213A are operable to condition current to electric motors 12A, 13A (e.g., DC-to-AC converters) respectively. The rectifier electronics 212B, 213B are operable to condition current from the generators 12B, 13B (e.g., AC-to-DC converters) respectively. The low-spool power conditioning electronics 212 and high-spool power conditioning electronics 213 can interface with an energy storage management system 216 that further interfaces with an energy storage system 218. The energy storage management system 216 can be a bi-directional DC-DC converter that regulates voltages between energy storage system 218 and electronics 212A, 212B, 213A, 213B. The energy storage system 218 can include one or more energy storage devices, such as a battery, a super capacitor, an ultra-capacitor, and the like. The energy storage management system 216 can facilitate various power transfers within the hybrid electric propulsion system 100. The energy storage management system 216 may also transfer power to one or more electric motors on the aircraft 10 of FIG. 1, or to external loads 217 and receive power from one or more external power sources 219 (e.g., power source 16 of FIG. 1, aircraft power, auxiliary power unit power, cross-engine power, and the like).

A power conditioning unit 220 and/or other components can be powered by the energy storage system 218. The power conditioning unit 220 can distribute electric power to support actuation and other functions of the gas turbine engine 20. For example, the power conditioning unit 220 can power an integrated fuel control unit 222 to control fuel flow to the gas turbine engine 20. The power conditioning unit 220 can also power a plurality of actuators (not depicted), such as bleed actuators, vane actuators, and the like.

One or more accessories 70 can also be driven by or otherwise interface with the gas turbine engine 20. Examples of accessories 70 can include oil pumps, fuel pumps, and other such components. As one example, the accessories 70 include an oil pump driven through gearing, such as mechanical power transmission 150B, in response to rotation of the high spool 32 and/or the high-spool electric motor 13A. Alternatively, accessories 70 can be electrically driven through power provided by the energy storage management system 216 or other such sources of electrical power.

Engagement and operation of the low-spool electric motor 12A, low-spool generator 12B, high-spool electric motor 13A, and high-spool generator 13B can change depending upon an operating state of the gas turbine engine 20 and any commands received. Collectively, any effectors that can change a state of the gas turbine engine 20 and/or the electrical power system 210 may be referred to as hybrid electric system control effectors 240. Examples of the hybrid electric system control effectors 240 can include the electric motors 12A, 13A, generators 12B, 13B, integrated fuel control unit 222, and/or other elements (not depicted).

Transfer of power between the low spool 30 and high spool 32 can be performed by configuring the electric machines 12, 13 in opposite modes of operation. For example, configuring the low-spool electric machine 12 in a low-spool generator mode of operation or engaging operation of the low-spool generator 12B can extract mechanical power and output electrical power that can drive the high-spool electric machine 13 in a high-spool motor mode of operation or upon engaging operation of the high-spool electric motor 13A. Further, a portion of the electric power output from the low-spool electric machine 12 can be stored in the energy storage system 218 and/or distributed elsewhere in the aircraft 10 of FIG. 1 through the energy storage management system 216.

As an example, during a braking condition, lowering fuel flow to a minimum fuel limit at engine idle can support combustion in the gas turbine engine 20 but may result in excess thrust leading to wear on the wheel and brake system 60. Engaging the low-spool generator 12B or operating the low-spool electric machine 12 in a low-spool generator mode can further reduce the rotational speed of the low spool 30 during the braking condition due to a mechanical load increase on the low spool 30. Using the low-spool generator 12B during a braking condition can reduce thrust below a nominal minimum thrust that typically results from operating the gas turbine engine 20 at idle while maintaining the minimum fuel limit, which may also be referred to as hybrid electric idle. The thrust reduction can also reduce the wear of brakes of the wheel and brake system 60 during the braking condition.

To maintain combustion and provide rotational power to the accessories 70, power from the low-spool generator 12B and/or from the energy storage system 218 can be transferred to the high-spool electric machine 13 in high-spool motor mode or the high-spool electric motor 13A while the low spool 30 is slowed. Speed and torque control of the high spool 32 can be monitored and adjusted by the addition of rotational power based on the demand associated with the one or more accessories 70 driven by the high spool 32 and one or more target engine pressures. When thrust reversers 75 are deployed on the gas turbine engine 20, a greater amount of compensation may be needed from the high-spool electric motor 13A. If engine braking through engaging the low-spool generator 12B is performed while the aircraft 10 of FIG. 1 is airborne, performance conditions, such as flutter, can be monitored to determine possible stability issues. Accordingly, the low-spool generator 12B can be disengaged or operated in a reduced output mode if needed to maintain stability within the gas turbine engine 20. Flutter may appear as unstable spinning of the fan 42, which can be detected through speed, vibrations, or other types of sensors.

Figure 3:
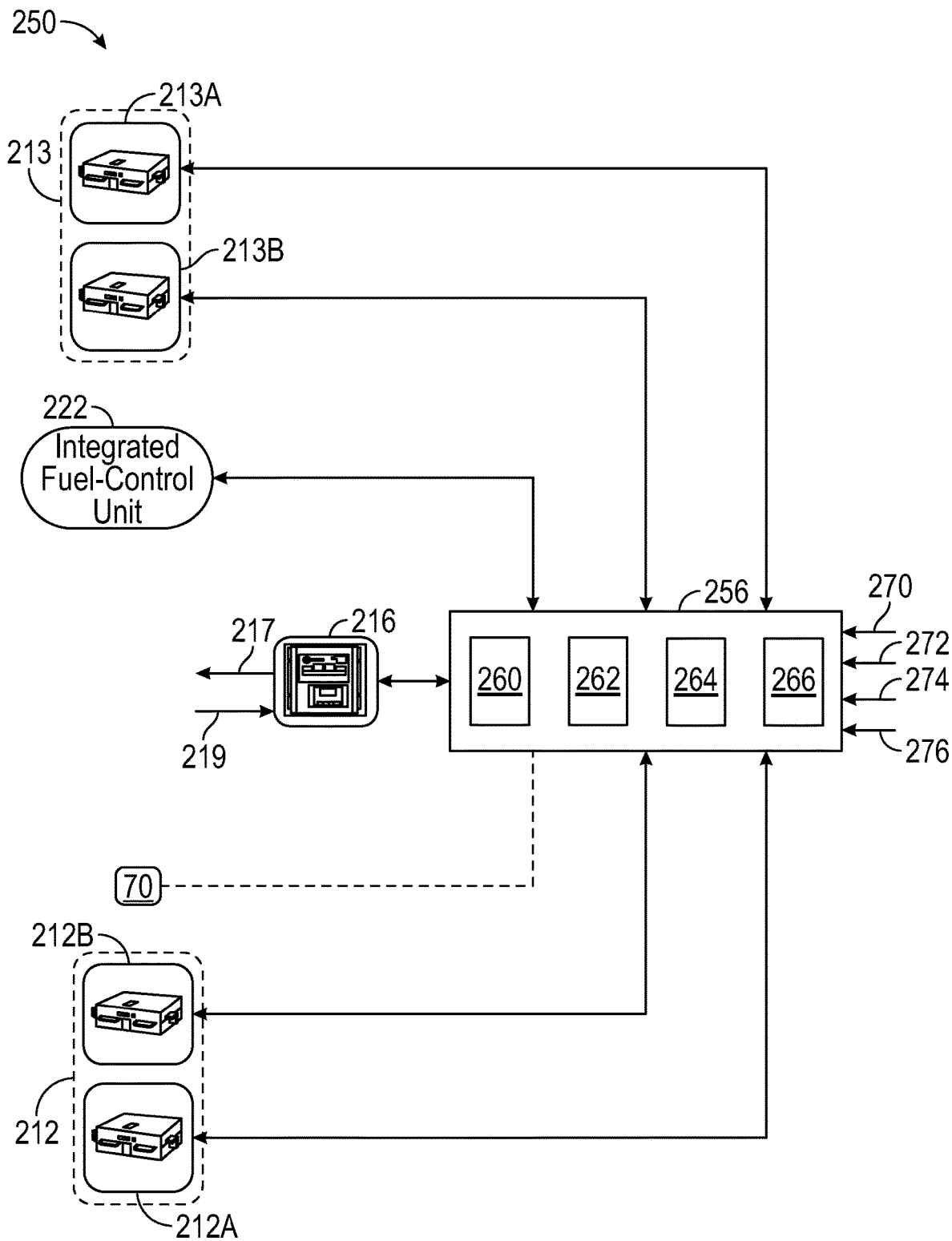
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the low-spool power conditioning electronics 212, high-spool power conditioning electronics 213, energy storage management system 216, integrated fuel control unit 222, accessories 70, and/or other components (not depicted) of the hybrid electric propulsion system 100. In embodiments, the controller 256 can control and monitor for fault conditions of the gas turbine engine 20 and/or the electrical power system 210. For example, the controller 256 can be integrally formed or otherwise in communication with a full authority digital engine control (FADEC) of the gas turbine engine 20. Alternatively, the controller 256 can be an aircraft level control or be distributed between one or more systems of the aircraft 10 of FIG. 1. In embodiments, the controller 256 can include a processing system 260, a memory system 262, and an input/output interface 264. The controller 256 can also include various operational controls, such as a hybrid engine control 266 that controls the hybrid electric system control effectors 240, for instance, based on a thrust command 270, an operating mode 272, a braking command 274, and/or a thrust reverser command 276. The thrust command 270 can be a throttle lever angle or a command derived based on a throttle lever angle control of the aircraft 10 of FIG. 1. The operating mode 272 can indicate whether the aircraft 10 is in a pre-takeoff taxi, takeoff, climb, cruise, descent, landing, or post-landing taxi mode, or other such operating modes, for example. The operating mode 272 can be determined by a system of the aircraft 10 based on tracking various parameters, such as weight-on-wheels, altitude, velocity, and other such aircraft parameters. The braking command 274 can indicate that the aircraft 10 is to be slowed based on a pilot command or other input. The thrust reverser command 276 can indicate a pilot request to deploy the thrust reversers 75 of FIG. 2.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 212A, 213A, rectifier electronics 212B, 213B, energy storage management system 216, integrated fuel control unit 222, accessories 70, and/or other components (not depicted) of the hybrid electric propulsion system 100. The controller 256 provides a means for controlling the hybrid electric system control effectors 240 using a hybrid engine control 266 that can be dynamically updated during operation of the hybrid electric propulsion system 100. The means for controlling the hybrid electric system control effectors 240 can be otherwise subdivided, distributed, or combined with other control elements.

The controller 256 with hybrid engine control 266 can apply control laws and access/update models to determine how to control and transfer power between the low spool 30 and high spool 32, as well as power transfers between multiple gas turbine engines 20. For example, sensed and/or derived parameters related to speed, flow rate, pressure ratios, temperature, thrust, and the like can be used to establish operational schedules and transition limits to maintain efficient operation of the gas turbine engine 20. For instance, the operating mode 272 of the gas turbine engine 20 can have different power settings, thrust requirements, flow requirements, and temperature effects. With respect to the aircraft 10 of FIG. 1, each of the gas turbine engines 20 can have different settings and splits between electric and fuel-burn based operations in one or more of the operating modes. The hybrid engine control 266 can control electric current provided to the low-spool electric motor 12A and high-spool electric motor 13A and loading effects of the low-spool generator 12B and high-spool generator 13B. The hybrid engine control 266 can also determine a power split between delivering fuel to the combustor 56 and using the low-spool generator 12B and/or high-spool electric motor 13A to modify rotation speeds and thrust of the gas turbine engine 20.

In embodiments, the controller 256 can blend the power distribution between the hybrid electric system control effectors 240 and fuel burn in the combustor 56. From a pilot's perspective, the setting of a throttle lever angle produces thrust command 270 without the pilot having to distinguish between whether motor-based thrust or fuel burn based thrust is needed, although the pilot may control whether fuel is on or off. With respect to the aircraft 10, the hybrid electric propulsion systems 100A, 100B can be independently controlled such that one of the hybrid electric propulsion systems 100A, 100B is operating in a fuel burning mode while the other of the hybrid electric propulsion systems 100A, 100B is operated using the low-spool electric motor 12A and/or the high-spool electric motor 13A.

Figure 4:
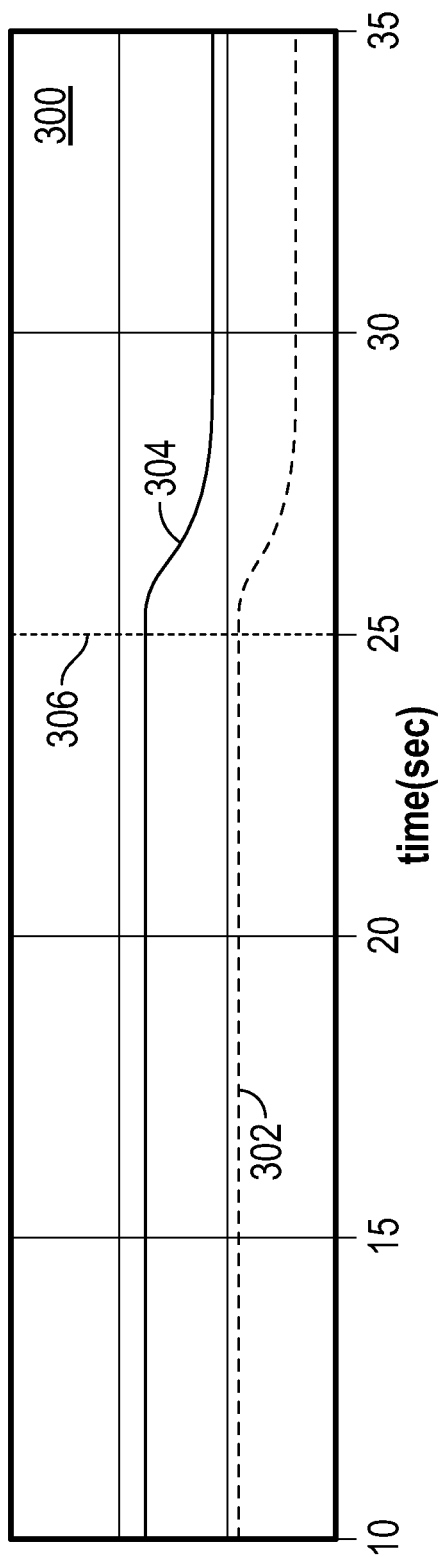
FIG. 4 is a plot of low-spool speed and thrust before and after a braking condition, in accordance with an embodiment of the disclosure.
Figure 5:
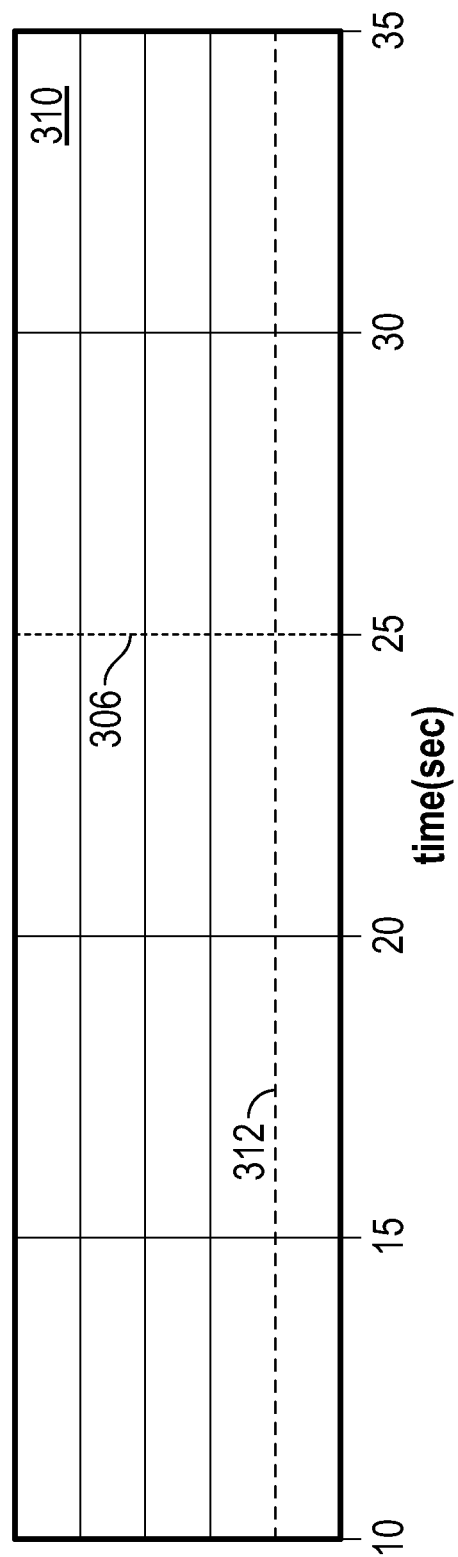
FIG. 5 is a plot of fuel flow before and after a braking condition, in accordance with an embodiment of the disclosure.

FIGS. 4-7 illustrate an example scenario of a response of the engine system 100 of FIG. 2 to a braking condition. FIG. 4 is a plot 300 of low-spool speed 302 and low-spool thrust 304 before and after a braking condition 306. FIG. 5 is a plot 310 of fuel flow 312 before and after the braking condition 306. FIG. 6 is a plot 320 of low-spool torque 322 and a high spool torque 324 before and after the braking condition 306. FIG. 7 is a plot 330 of low-spool electrical power output 332 and high-spool electric power output 334 before and after the braking condition 306. In the example scenario of FIGS. 4-7, gas turbine engine 20 is running on a minimum fuel limit and cannot reach a lower thrust. The braking condition 306 occurs at about a time of 25 seconds, and the controller 256 switches to a thrust spoiling mode where a further reduction of the low-spool speed 302 and low-spool thrust 304 is initiated while the fuel flow 312 remains at the minimum fuel limit. The controller 256 puts the low-spool electric machine 12 in low-spool generator mode or engages the low-spool generator 12B depending on the system configuration. The low-spool generator 12B absorbs some energy from the low spool 30, increasing low-spool torque 322 and low-spool electrical power output 332. The controller 256 can also put the high-spool electric machine 13 into high-spool motor mode or engage the high-spool electric motor 13A that reduces high spool torque 324 and high-spool electric power output 334. Although the sequence of FIGS. 4-7 illustrates one example scenario, many other braking and power transfer scenarios can be achieved by the engine system 100 of FIG. 2.

Figure 8:
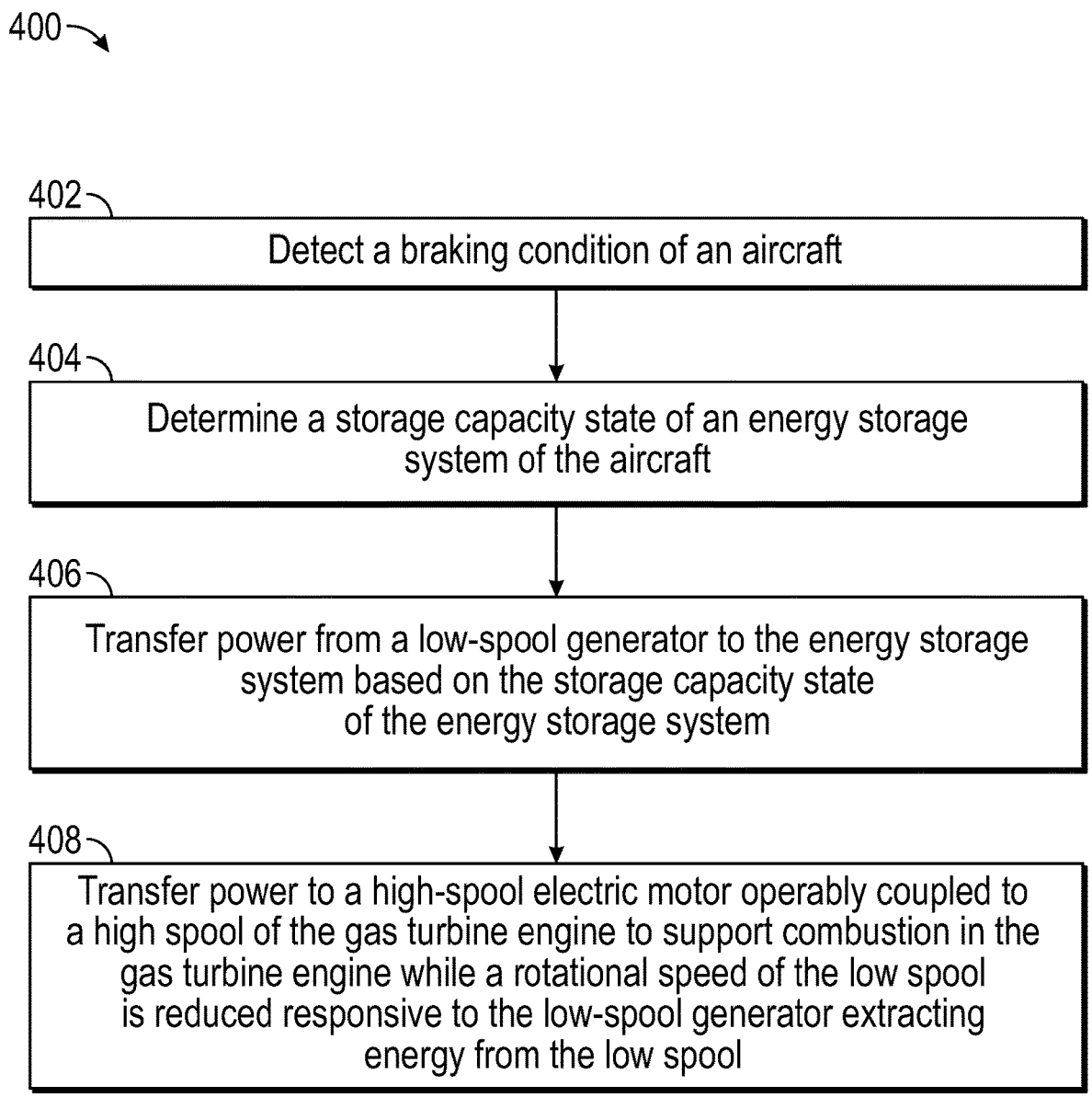
FIG. 8 is a flow chart illustrating a method, in accordance with an embodiment of the disclosure.

Referring now to FIG. 8 with continued reference to FIGS. 1-7, FIG. 8 is a flow chart illustrating a method 400 for providing hybrid electric idle and braking for an aircraft, in accordance with an embodiment. The method 400 may be performed, for example, by the aircraft 10 through the hybrid electric propulsion systems 100A, 100B of FIG. 1. For purposes of explanation, the method 400 is described primarily with respect to the hybrid electric propulsion system 100 of FIG. 2; however, it will be understood that the method 400 can be performed on other configurations (not depicted).

Method 400 pertains to the controller 256 executing embedded code for braking and thrust control using hybrid engine control 266 along with other control functions, where the controller 256 can be an aircraft-level control or distributed between aircraft and engine system levels of control.

At block 402, the controller 256 can detect a braking condition of the aircraft 10. The braking condition can be received as an input signal based on a pilot request, such as braking command 274. The braking condition can be an intermittent braking condition that occurs for a predetermined interval. For example, the intermittent braking condition can be used to reduce acceleration, such as inching forward during ground-based operation of the aircraft 10. After the predetermined interval elapses, the braking condition may be removed, for instance, until another braking command 274 is received. There can be an interval between braking applications to support intermittent braking. For example, braking can be applied using a braking on-off duty cycle which can be configured within a range. For instance, the duty cycle can be a configured with braking active 10%, 25%, 50%, 75%, 90%, or another value between braking fully on and fully off during intermittent braking. Further, the braking condition may be detected based on operating conditions of the gas turbine engine 20 and/or the aircraft 10. For example, the braking condition can be determined based on a thrust command 270 and an operating mode 272 of the aircraft 10, such as an idle thrust in a taxi mode or a landing mode. The braking condition need not be associated with an explicit command to apply brakes. Other operating modes above idle where reduced power settings are desired may also or alternatively be a valid operating condition for the process described herein.

At block 404, the controller 256 can determine a storage capacity state of the energy storage system 218 of the aircraft 10. The storage capacity state can indicate a capacity to receive a power surge from the low-spool generator 12B of one or more of the gas turbine engines 20. The determination can include considering whether both gas turbine engines 20 are operating in a fuel combustion state, an electrical demand of the aircraft 10 from the energy storage system 218, and storage capacity remaining. The ability of the energy storage system 218 to accept an influx of current from the low-spool generator 12B of either or both of the gas turbine engines 20 of the aircraft 10 may use a customized charging schedule where the ability of the energy storage system 218 to be charged can have a non-linear mapping. For instance, a charging rate between a 50% and 60% capacity may differ from a charging rate between 90% and 100% capacity.

At block 406, power can be transferred from a low-spool generator 12B to the energy storage system 218 based on the storage capacity state of the energy storage system 218. The controller 256 can be configured to split energy output of the low-spool generator 12B between the energy storage system 218 and the high-spool electric motor 13A based on the storage capacity state and a target speed of the high spool 32. The energy transfer can be performed in response to detecting the braking condition or during braking.

At block 408, power can be transferred to the high spool 32 through the high-spool electric motor 13A to support combustion in the gas turbine engine 20 while a rotational speed of the low spool 30 is reduced responsive to the low-spool generator 12B extracting energy from the low spool 30. For example, the controller 256 can determine a demand associated with one or more accessories 70 driven by the high spool 32 and one or more target engine pressures. The high-spool electric motor 13A can be controlled to adjust a rotational speed of the high spool 32 based on the demand associated with the one or more accessories 70 driven by the high spool 32 and the one or more target engine pressures. Power transfer to the high spool 32 through the high-spool electric motor 13A can be performed or modified when the thrust reverser 75 is deployed. The power transfer can be performed in response to detecting the braking condition or during braking.

The controller 256 can also be configured to monitor for a flutter condition during landing of the aircraft 10 and adjust operation of the low-spool generator 12B and/or the high-spool electric motor 13A to reduce the flutter condition. The braking condition can include operating the gas turbine engine 20 at a minimum fuel limit. The low-spool generator 12B can reduce a speed and thrust output of the low spool 30 below nominal minimum values associated with the minimum fuel limit by adding a load to the low spool 30.

While the above description has described the flow process of FIG. 8 in a particular order, it should be appreciated that unless otherwise specifically required in the attached claims that the ordering of the steps may be varied. Also, it is clear to one of ordinary skill in the art that, the hybrid electric idle and braking described herein can be combined with aircraft and propulsion system control features, such as fuel flow control, power management, emergency operation, and the like.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
    detecting a braking condition of an aircraft comprising a gas turbine engine, the gas turbine engine comprising a low spool and a high spool;
    determining a storage capacity state of an energy storage system of the aircraft;
    transferring power from a low-spool generator to the energy storage system based on the storage capacity state of the energy storage system;
    transferring power to the high spool through a high-spool electric motor to support combustion in the gas turbine engine while a rotational speed of the low spool is reduced responsive to the low-spool generator extracting energy from the low spool, wherein the low-spool generator is used as a brake of the low spool by selectively adding a load to the low spool; and
    splitting energy output of the low-spool generator between the energy storage system and the high-spool electric motor, using a controller, based on the storage capacity state and a target speed of the high spool wherein the storage capacity state indicates a capacity to receive a power surge from the low-spool generator with a non-linear mapping having a first charging rate and a second charging rate, different from the first charging rate, wherein the first charging rate is defined over a first storage capacity range and the second charging rate is defined over a second storage capacity range, the first storage capacity range being different from the second storage capacity range;
    wherein the controller is configured to split the energy output of the low-spool generator to charge the energy storage system at the first charging rate and the second charging rate over the first storage capacity range and over the second storage capacity range, respectively, based on the storage capacity state.

2. The method of claim 1, further comprising:
detecting the braking condition based on a thrust command and an operating mode of the aircraft.

3. The method of claim 2, wherein power transfer is performed based on determining that the operating mode of the aircraft is a taxi mode or a landing mode.

4. The method of claim 1, wherein the low-spool generator is a low-spool electric machine configurable between a low-spool generator mode and a low-spool motor mode of operation, and the high-spool electric motor is a high-spool electric machine configurable between a high-spool generator mode and a high-spool motor mode of operation.

5. The method of claim 1, further comprising:
determining a demand associated with one or more accessories driven by the high spool and one or more target engine pressures; and
controlling the high-spool electric motor to adjust a rotational speed of the high spool during the braking condition based on the demand associated with the one or more accessories driven by the high spool and the one or more target engine pressures.

6. The method of claim 1, further comprising:
monitoring for a flutter condition during landing of the aircraft; and
adjusting operation of the low-spool generator and/or the high-spool electric motor to reduce the flutter condition.

7. The method of claim 1, wherein the braking condition comprises operating the gas turbine engine at a minimum fuel limit, and the low-spool generator reduces a speed and thrust output of the low spool below nominal minimum values associated with the minimum fuel limit by adding a load to the low spool.

8. The method of claim 1, wherein the gas turbine engine further comprises a thrust reverser, and power transfer to the high spool through the high-spool electric motor is performed when the thrust reverser is deployed.

9. An engine system of an aircraft, the engine system comprising:
an energy storage system;
a gas turbine engine comprising a low spool, a high spool, a low-spool generator operably coupled to the low spool, and a high-spool electric motor operably coupled to the high spool; and
a controller configured to:
detect a braking condition of the aircraft;
determine a storage capacity state of the energy storage system;
transfer power from the low-spool generator to the energy storage system based on the storage capacity state of the energy storage system;
transfer power to the high spool through the high-spool electric motor to support combustion in the gas turbine engine while a rotational speed of the low spool is reduced responsive to the low-spool generator extracting energy from the low spool, wherein the low-spool generator is used as a brake of the low spool by selectively adding a load to the low spool;
split energy output of the low-spool generator between the energy storage system and the high-spool electric motor based on the storage capacity state and a target speed of the high spool, wherein the storage capacity state indicates a capacity to receive a power surge from the low-spool generator with a non-linear mapping having a first charging rate and a second charging rate, different from the first charging rate, wherein the first charging rate is defined over a first storage capacity range and the second charging rate is defined over a second storage capacity range, the first storage capacity range being different from the second storage capacity range; and
charge the energy storage system at the first charging rate and the second charging rate over the first storage capacity range and over the second storage capacity range, respectively, based on the storage capacity state.

10. The engine system of claim 9, wherein the controller is further configured to detect the braking condition based on a thrust command and an operating mode of the aircraft.

11. The engine system of claim 10, wherein power transfer is performed based on determining that the operating mode of the aircraft is a taxi mode or a landing mode.

12. The engine system of claim 9, wherein the low-spool generator is a low-spool electric machine configurable between a low-spool generator mode and a low-spool motor mode of operation, and the high-spool electric motor is a high-spool electric machine configurable between a high-spool generator mode and a high-spool motor mode of operation.

13. The engine system of claim 9, wherein the controller is configured to:
determine a demand associated with one or more accessories driven by the high spool and one or more target engine pressures; and
control the high-spool electric motor to adjust a rotational speed of the high spool during the braking condition based on the demand associated with the one or more accessories driven by the high spool and the one or more target engine pressures.

14. The engine system of claim 9, wherein the controller is configured to monitor for a flutter condition during landing of the aircraft and adjust operation of the low-spool generator and/or the high-spool electric motor to reduce the flutter condition.

15. The engine system of claim 9, wherein the braking condition comprises operating the gas turbine engine at a minimum fuel limit, and the low-spool generator reduces a speed and thrust output of the low spool below nominal minimum values associated with the minimum fuel limit by adding a load to the low spool.

16. The engine system of claim 9, wherein the gas turbine engine further comprises a thrust reverser, and power transfer to the high spool through the high-spool electric motor is performed when the thrust reverser is deployed.

* * * * *